Patented Aug. 17, 1948

2,446,998

UNITED STATES PATENT OFFICE 2,446,998

PROCESS OF CATALYTICALLY TREATING HYDROCARBONS WITH HYDROGEN FLUORIDE AND BORON TRIFLUORIDE IN THE PRESENCE OF HYDROGEN

Robert E. Burk, Cleveland Heights, Ohio, assignor to The Standard Oil Company, Cleveland, Ohio, a corporation of Ohio No Drawing. Application November 20, 1943, Serial No. 511,106

4 Claims. (Cl. 260—683.5)

This invention relates to the treatment of hydrocarbons with a liquid catalyst comprising primarily hydrogen fluoride and a minor amount of boron trifluoride in the presence of hydrogen.

It is an object of the invention to treat hydrocarbons to alter their molecular weight and/or chemical configuration, using as a catalyst therefor hydrogen fluoride and boron trifluoride, said treatment being carried out in the present of the hydrogen.

A further object of the invention is the provision of a process in which products are formed which have great value as compared with the starting materials.

Still an additional object of the invention is to provide a process in which unsaturates can be converted to saturates, although not necessarily having the same number of carbon atoms.

A further object of the invention is the provision of a process in which the amount of hydrocarbon which becomes combined or associated with the catalyst phase is small, thereby avoiding degradation of the stock used as a starting material in the process.

The process of the invention is applicable to a wide variety of hydrocarbon reactions, among which may be mentioned isomerizing, such as the isomerization of butane, pentane, and hexane, and other aliphatic hydrocarbons as well as alicyclic hydrocarbons, such as naphthenes, as well as aromatics with side chains, etc., to form isomers thereof, or the isomerization of natural gasoline to improve its knock rating; cracking hydrocarbons; averaging hydrocarbons in which lower and higher molecular weight hydrocarbons are reacted to yield hydrocarbons of intermediate molecular weight; alkylating isoparaffins and aromatics; and converting propane to a higher molecular weight hydrocarbon by treatment alone or in the presence of pentane.

Liquid hydrogen fluoride, in which a minor amount of boron trifluoride is dissolved, is an admirable catalyst for effecting a wide variety of hydrocarbon reactions, including those mentioned above as well as many others. In addition to effecting the reactions, the catalyst is desirable because of the fact that hydrogen fluoride is a liquid at about room temperature and lower temperatures, and may be kept in the liquid phase at temperatures and pressure at which hydrocarbons are conveniently treated. However, because of its relatively low boiling point it may be removed readily from the hydrocarbons after the completion of the treating operation. Boron trifluoride is a gas (boiling point: —150° F.) at most temperatures and pressures encountered in hydrocarbon treating processes. However, boron trifluoride dissolves to a given extent in liquid hydrogen fluoride and the amount that dissolves depends on the partial pressure of the boron trifluoride at any given temperature. At higher partial pressures larger amounts of boron trifluoride are dissolved in hydrogen fluoride. Thus the composition of the catalyst, i. e., the relative proportions of the two flourides, may be regarded as a function of the amount of boron trifluoride dissolved in the liquid hydrogen fluoride and therefore as a function of the partial pressure of the boron trifluoride.

The amount of boron trifluoride dissolved in the hydrogen fluoride, at any given temperature, may be expressed conveniently in terms of the partial pressure of boron trifluoride. This may vary in accordance with the invention from a trace up to 550 pounds per square inch. Generally about 5 to 300 pounds per square inch will be used. However, the amount should under no circumstance exceed 50 mol per cent of the fluorides. With the partial pressures usually used, the amount dissolved does not exceed 15 mol per cent. The words "dissolve" and "solution" are used as generic to both a physical admixture and any possible reaction product.

If the hydrocarbon reacting ingredients include an olefin, such as in an alkylation process, or if an olefin is introduced or formed in any of the above processes as a promoter, the available evidence indicates that the hydrogen fluoride-boron trifluoride solution, or any reaction product, may form a new compound or chemical complex which may be an ingredient of the catalyst.

It is immaterial in accordance with the invention whether the catalyst is hydrogen flouride promoted by boron trifluoride or also promoted by an olefin.

The ingredients comprising the catalyst may be brought together in any order or simultaneously. Generally it is convenient to feed the two fluorides to the hydrocarbon reaction zone in admixture under the desired boron trifluoride partial pressure, although they may be introduced separately if desired. If an olefin is to be added as a promoter, this may be absorbed in the fluorides, or may be fed to the reaction zone separately or along with any hydrocarbon materials being treated; it may comprise ½ to 25 weight per cent of said hydrocarbons.

One of the advantages of the catalyst above described is the ability to adjust the activity of the catalyst through control of its composition.

This may be accomplished by varying the partial pressure of the boron trifluoride inasmuch as a change in this partial pressure results in a change in the amount of boron trifluoride dissolved. If the partial pressure of the boron trifluoride is increased, by admitting boron trifluoride to the reaction zone from a high pressure source of supply, the amount dissolved is increased and the activity of the catalyst is greater. If this partial pressure is decreased, by bleeding boron trifluoride, the amount dissolved is decreased. When an olefin is present the activity of the catalyst may be adjusted by varying the amount of the olefin.

Another advantage of the catalyst is the fact that hydrogen fluoride and boron trifluoride may be completely recovered as such at the conclusion of the catalytic treating operation if desired, and can be reused. This is an advantage not attendant with the use of metal halides.

Another advantage of the catalyst is the ability to carry out the operation in a liquid phase, because the catalyst and hydrocarbon may be maintained in a liquid phase at appropriate temperatures and pressures. Since the hydrocarbon and the liquid catalyst are relatively insoluble in each other, they separate as two phases at the end of the treating operation, and the bulk of the catalyst can be separated by settling and decanting or by centrifuging. The catalyst phase is often referred to as the "lower layer" because it is heavier than the hydrocarbon phase. However, since the catalyst can be placed in a vapor phase at temperatures not too high above room temperature, unless very high pressures are used, the operation can be carried out with the catalyst in the vapor phase, and also one or more of the reacting ingredients or the final product may be in the vapor phase if this is desired. The flexibility of the catalyst, and the ability to use it in liquid or vapor phase operations at temperatures and pressures not too high above nor too low below room temperature and atmospheric pressure, is an important advantage. My invention, however, contemplates primarily an operation in which the catalyst is in the liquid phase as it is in this method of operation that the advantages of the invention become more significant.

A possible disadvantage of the use of the catalyst, prior to my invention, is the fact that a portion of the hydrocarbon being treated tends to form a complex with the catalyst, which hydrocarbon is retained in the liquid catalyst phase. This condition is particularly noticeable when an olefin is present or when cracking takes place so that olefins are formed. While the catalyst may be recovered from the lower layer, there is some risk of degrading the hydrocarbon so that it is of lower value. Also the recovery adds to the processing operations required. As a result, the minimizing of lower layer formation is very important.

I have discovered that all of the advantages of using hydrogen fluoride with boron trifluoride as a catalyst above enumerated and others inherent therein may be retained, and that the disadvantages may be eliminated to a large extent, even when an olefin is present in the process, if the reaction is carried out in the presence of added hydrogen.

The following example will further illustrate the advantages and the results that may be obtained in accordance with the invention: A $C_5$ stock consisting of 92% normal pentane and 8% amylene was treated with 50 volume per cent hydrogen fluoride (based on the hydrocarbon) in which boron trifluoride was dissolved in an amount to provide a partial pressure of boron trifluoride of 150 pounds per square inch. The reaction was carried out by mixing the hydrocarbon and the catalyst with agitation for a period of 60 minutes at a temperature of 90° F., and in the presence of hydrogen to provide a total pressure of 1000 pounds per square inch. The following table shows a comparison of the stock treated and the products obtained:

Stock:

| | Weight per cent of charge |
|---|---|
| Normal pentane | 92 |
| Amylene | 8 |

Product:

| | |
|---|---|
| Less than butane (propane) | 0.2 |
| Isobutane | 13.0 |
| Normal butane | 0.0 |
| Isopentane | 34.8 |
| Normal pentane | 38.5 |
| Above pentane | 16.2 |
| Lower layer hydrocarbon | 0.0 |

The product from the reaction in the presence of hydrogen appears very favorable in a number of ways. The amount of propane formed is negligible. The yield of isobutane is substantial and is particularly significant in view of the fact that no normal butane is formed. In view of this fact, the isobutane may be readily separated for use in alkylation processes. The yield of isopentane is desirably large and as this is a valuable product, this aspect of the process is significant. The fraction boiling higher than pentane was a gasoline of very good quality, the octane number (A. S. T. M.+4 cc. TEL/gal.) being 105.5. The conversion of the charge to products other than normal pentane, all of value, is 64.2 per cent of the charge, and the unconverted normal pentane (35.8 per cent) may be recycled for further treatment. The process may be carried out in the presence of butanes if it is desired to minimize butane formation and the isobutane formed or part of it may be recycled.

A similar process of treating pentane without amylene, and not utilizing hydrogen, results in about 12% hydrocarbons lost in the lower layer. This amount would be greater when amylene is used.

The above process may be carried out with normal pentane without amylene. However, since the presence of unsaturates tends to increase lower layer formation, the illustrative example selected used unsaturates to demonstrate the advantages of the invention. Similarly the process may be applied to the isomerization of butane, which may be carried out in the presence of butenes, and to the isomerization of hexanes alone or in the presence of $C_6$ or lower olefins. Natural gasoline may be treated similarly to increase the branched chain hydrocarbon content.

As illustrative of another embodiment of my invention, ethylene is treated with the above described catalyst in the presence of hydrogen to form ethane. In accordance with this example, hydrogen and ethylene were mixed in the ratio of 57.4% ethylene. The reactor was charged with 600 cc. of liquid HF and boron trifluoride in an amount to provide a partial pressure of 150 pounds per square inch. Hydrogen was then introduced into the reactor to provide a partial pressure of 500 pounds per square inch. Following this the hydrogen-ethylene mixture was fed into the reactor at such a rate that a temperature of 90°

F. was maintained and not exceeded. The total reaction time was 60 minutes. The feeding of the hydrogen-ethylene mixture was stopped when the total pressure reached 1000 pounds per square inch. After this the gas in the reactor was bled out through caustic scrubbers and collected. The liquid catalyst phase was siphoned off and analyzed for hydrocarbon content.

Analysis of the products formed showed 9.5% of the ethylene charged was in the catalyst phase. There was a relatively large material loss (nearly one-half), and 45.5% of the ethylene charged was recovered in the gaseous phase; the loss of 46% is attributable to the technique employed. However, of the 45.5% of the gases recovered, 96.7% was ethane; 43% of the ethylene charged was recovered as ethane.

The conditions under which the process is carried out will vary with the reaction it is desired to effect as well as upon the starting materials and the products wanted. In general, the temperature may vary from −30° to 250° F. Generally a range from 32° F. through room temperature to 190° F. is preferred. It is an advantage of the new catalyst that extreme temperatures in either direction are not needed.

The amount of the liquid catalyst used in the process may vary, depending upon the reaction and upon other conditions, and may be from 1 to 300 volume per cent based on the liquid hydrocarbons to be treated. Amounts of the order of 5 to 100 volumes per cent are generally used.

The hydrogen fluoride and the boron trifluoride may be the commercially available grades. It is not necessary to have chemically pure fluorides. The impurities in the commercial grades including water, which as a general rule are present in an amount of not over 1%, do not interfere with the operation of the catalyst in my process. In view of the economic advantages of using the commercial grade, this is preferred, and was used in the following examples.

The time of contact between the hydrocarbon and the catalyst may vary with the temperature, thoroughness of contact between the hydrocarbon and the catalyst, and other factors, and depending upon such other factors the time should be selected to give optimum yields. This will be from a few minutes to several hours. With thoroughness of mixing possible in a commercial embodiment the time may be reduced materially below that indicated in the examples. Commercial considerations indicate the time necessary should be the minimum to permit the reaction to go to the desired extent under the other operating conditions.

The amount of boron trifluoride as represented by its partial pressure has been indicated heretofore in describing the composition of the catalyst. The total pressure preferably is sufficient to keep the catalyst in the liquid phase at the temperature employed, and preferably also to keep hydrocarbons liquid at the temperature employed, unless the operation is to be in the vapor phase.

In general, milder conditions may be used for isomerizing, and since desirable equilibrium conditions in general indicate lower temperatures, the mild conditions are obtained preferably by using a lower temperature. Such conditions can also be obtained by a lower partial pressure of boron trifluoride. Cracking requires somewhat more drastic conditions and higher temperatures; a larger amount of catalyst, higher boron trifluoride partial pressures, etc. may be used.

The first example may be viewed as a reaction in which primarily isomerizing is accomplished by my new process. However, the isobutane production indicates some cracking and the gasoline production indicates some alkylating probably attributable mostly to the amylene present in the charge stock.

"Averaging" requires conditions which are suitable for cracking and alkylating, and the catalyst in general should be powerful but the temperature should not be too high.

The temperature, composition of the catalyst, time of contact and other factors are more or less interdependent. For example, if a lower temperature is used, a somewhat larger amount of catalyst may be present or a somewhat higher partial pressure of boron trifluoride may be present, or both, to obtain the same result as would be obtained with a higher temperature and a lesser amount of catalyst or a lower partial pressure of boron trifluoride. While the range of temperature, time of contact, amount of catalyst, partial pressure of the boron trifluoride, etc., may be the same for all of the hydrocarbon treating processes, this does not mean that the same conditions can be used to effect different processes. For example, mild conditions for isomerizing without cracking may be obtained at a given high temperature by using a low partial pressure of boron trifluoride. Thus for almost any temperature a given mild or given drastic condition may be obtained by adjusting other variables, such as amount of catalyst, time of contact, the boron trifluoride partial pressure and composition of reactants. It is an important aspect of the invention that in addition to varying temperature, the amount of catalyst, the time of contact, etc., which are variables the prior art has usually available, the catalyst provides a new variable through the control of partial pressure of boron trifluoride.

The partial pressure attributable to the presence of hydrogen, which, in general, will be the total pressure less the partial pressure of boron trifluoride and any pressure attributable to the hydrocarbons and hydrogen fluoride may vary over a wide range, depending upon the reaction. In instances where lower layer formation is not a particularly critical problem it will not be necessary to employ as large an amount of hydrogen as in instances where severe cracking occurs and lower layer formation is aggravated. Generally a partial pressure of hydrogen within a range of 50 to 2000 pounds per square inch is indicated.

When the process is to be applied to cracking it is generally preferred to apply it to stocks somewhat heavier than that given in the above example, such as naphthas and other cracking stocks. The operations may be carried out in the presence of olefins and/or light stocks such as n- and iso-butanes and pentanes and these may be recycled to the reaction zone. Somewhat more drastic conditions are used when the process is applied to cracking. The advantages of the invention are particularly significant when applied to cracking. When the process is to be applied to "averaging," a low molecular weight hydrocarbon, such as butane or pentane and a higher molecular weight hydrocarbon, such as kerosene, naphtha or gas oil, are reacted in the presence of the catalyst and in the presence of hydrogen to form hydrocarbons of molecular weights intermediate of the molecular weights of the two reacting materials. An olefin may be present as a promoter. The unreacted hydrocarbons, including butane or pentane, or isomers thereof formed in averaging, may be recycled to the reaction zone, as well as unwanted products formed in the reaction.

In alkylation processes an isoparaffin or an aromatic is reacted with an olefin, preferably with the isoparaffin or an aromatic in excess.

The catalyst used in accordance with the invention, namely, liquid hydrogen fluoride containing a minor proportion of boron trifluoride dissolved therein, may be used in dearomatizing or desulfurizing processes, and hydrogen may be used in connection with the same. In accordance with this embodiment of the invention a hydrocarbon fraction containing aromatics and/or sulfur compounds or both, is treated with the catalyst in the liquid phase under mild conditions and for a relatively short time, whereupon the principal action is the removal of a major portion of aromatics and/or sulfur compounds from the hydrocarbon fraction, depending upon the composition of the hydrocarbon fraction being treated. The aromatics and/or sulfur compounds are retained in the catalyst phase probably in the form of a loose chemical complex with the fluorides, the latter being releasable in accordance with the procedure mentioned hereinafter.

Auxiliary hydrogenating catalyst may be present in any of the above-described processes.

The processes are adapted either for batch operation or for continuous operation. In the case of batch operation, the hydrocarbons to be treated, hydrogen and the fluorides are brought together in any order in a suitable container or autoclave where they are preferably subjected to agitation and maintained under the desired temperature and pressure conditions for the required length of time. The boron trifluoride and the hydrogen partial pressures may be maintained during the reaction from high pressure sources of these materials. Following the treating operation the materials will stratify when permitted to come to a quiescent state, or if desired, forces greater than gravity, such as centrifuging, may be used to effect the separation. The lighter or upper layer will contain the hydrocarbons, and the lower layer will comprise the catalyst. If the pressure is released the hydrogen and the boron trifluoride may be sent to storage for reuse later. If the temperature is higher than 67° F. the hydrogen fluoride also will be released and may be condensed or retained in the gaseous phase. However, the separation may be made under pressure and all of the ingredients except the removed hydrocarbon layer may be retained in the autoclave.

In a continuous process the fluorides, hydrocarbons and hydrogen are fed through a continuous type mixer, for example, a three-stage mixer where they are maintained at the desired temperature and under the appropriate pressures. The rate of flow through the mixer may be adjusted so that the hydrocarbons are in contact with the catalyst for the desired length of time as they pass through the mixer. The mixture may then be fed through a separator where it is permitted to stratify. The upper hydrocarbon layer may be continuously withdrawn and fractionated and the material not converted to the desired products or any part thereof may be recycled to the mixer. The lower layer catalyst phase also may be recirculated to the mixer.

The catalyst, after separation from the hydrocarbon at the conclusion of the treating process may be reused for treating a separate amount of the hydrocarbon in the same or a different process. Since the catalyst will not have become seriously degraded as a result of forming a complex, the process is particularly adapted to a continuous process in which the catalyst is reused.

On the other hand, if the hydrocarbon builds up in the catalyst phase or the catalyst becomes deactivated through continuous use, it may be desirable to withdraw a portion or all of the catalyst phase and subject it to a relatively high temperature, for example 250 to 600° F. At this temperature the fluorides are liberated from the catalyst phase as gases and can be collected and condensed and/or compressed and returned to the mixing zone or stored or otherwise used. The catalyst may be subjected to this temperature in a conventional pot-type still or by means of flash distillation.

Alternatively, instead of distilling the fluorides from the catalyst phase, it may be treated with a material which exerts a solvent action on the fluorides and which is immiscible with the hydrocarbons in the catalyst phase or which forms a chemical compound or complex with the fluorides and from which the fluorides may be released later, for example by heating. Such a material may be dihydroxyfluoboric acid. Another alternative is to distill off a part or most of the fluorides from the catalyst phase and remove the rest by extraction with such a material. The hydrocarbons in the upper layer also can be treated with such a material to extract any fluorides that may be dissolved therein.

Hydrogen may also be used in the treatment of the lower layer catalyst phase even though the catalytic operation which resulted in the lower layer formation does not involve the use of hydrogen. In accordance with this modification the lower layer catalyst phase is subjected to hydrogen which is thought to hydrogenate the hydrocarbon-fluorides complex and liberate the fluorides which would then be carried off by the partial pressure effects.

It is desirable that the stock to be treated be relatively free from aromatics since aromatics tend to form a complex with the catalyst, as has been mentioned heretofore, and this tends to deactivate the catalyst. If desired, the catalyst, after being used or reused in any of the hydrocarbon treating processes, may be used for dearomatizing fresh stock in accordance with the description in my Patent No. 2,343,744, dated March 7, 1944.

In view of the above explanation, one skilled in the art will understand how to practice my process, and while further explanation or theory is not needed, and I do not intend to be limited to the same, the following may be of assistance in understanding the invention:

It appears possible that upon subjecting a saturated hydrocarbon to the catalyst the following reaction may occur:

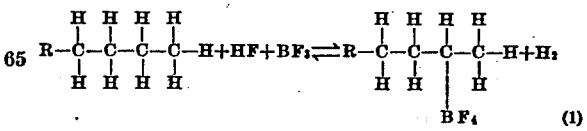

(1)

where R is hydrogen or a hydrocarbon residue.

The reaction may continue further:

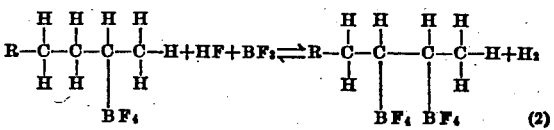

(2)

The reaction 2 may proceed in this manner to form heavy materials such as tars which inactivate the catalyst because a large amount of HF4 radical becomes tied in the polymerization products and the products themselves are of low value.

In accordance with my invention I envisage that the application of hydrogen forces the reaction (2) to the left, thereby minimizing the bad effects resulting therefrom and permitting the modification in molecular structure of the hydrocarbon in the presence of the catalyst without large quantities of the catalyst permanently combining with the hydrocarbons.

The expression "hydrocarbon fraction" is used herein as generic to a single hydrocarbon or a mixture of hydrocarbons of the same or different number of carbon atoms. The expression "modify" is used as generic to a change in molecular arrangement and/or a change in the number of carbon atoms, such as isomerizing, cracking, averaging, etc.

My invention is capable of many applications and embodiments as will be apparent to one skilled in the art in view of the disclosure herein and all are to be included as one within the scope of my claims.

I claim:

1. A process of catalytically treating hydrocarbons which comprises subjecting a hydrocarbon fraction containing a normal paraffin and an olefin, in the presence of hydrogen in an amount to provide a partial pressure of hydrogen from 50 to 2000 pounds per square inch, to the action of 5 to 300 volume percent (based on the hydrocarbons) of a liquid catalyst comprising as its essential catalytic ingredients liquid hydrogen fluoride in which is dissolved not over 50 mol percent of boron trifluoride (based on the total fluorides) to provide a partial pressure of boron trifluoride of 5 to 550 pounds per square inch, continuing the reaction at a temperature of −35 to 250° F. under a total pressure to maintain the hydrogen fluoride liquid at the temperature employed, whereby at least a part of said olefin is converted into saturated hydrocarbons along with the modification of the normal paraffin, and the amount of hydrocarbons accumulating in the liquid catalyst is minimized.

2. A process of catalytically isomerizing hydrobons which comprises subjecting a hydrocarbon fraction containing a normal paraffin and an olefin having the same number of carbon atoms as said normal paraffin, in the presence of hydrogen in an amount to provide a partial pressure of hydrogen from 50 to 2000 pounds per square inch, to the action of 5 to 300 volume percent (based on the hydrocarbons) of a liquid catalyst comprising as its essential catalytic ingredients liquid hydrogen fluoride in which is dissolved not over 50 mol percent of boron trifluoride (based on the total fluorides) to provide a partial pressure of boron trifluoride of 5 to 550 pounds per square inch, continuing the reaction at an isomerizing temperature under a total pressure to maintain the hydrogen fluoride liquid at the temperature employed, whereby at least a part of said olefin is converted into saturated hydrocarbons along with the production of isomers of said normal paraffin, and the amount of hydrocarbons accumulating in the liquid catalyst is minimized.

3. A process of catalytically treating hydrocarbons which comprises subjecting hydrocarbons comprising a normal paraffin and an olefin, in the presence of hydrogen in an amount to provide a partial pressure of hydrogen from 50 to 2000 pounds per square inch, to the action of 5 to 300 volume percent (based on the hydrocarbons) of a liquid catalyst comprising as its essential catalytic ingredients liquid hydrogen fluoride in which is dissolved not over 50 mol percent of boron trifluoride (based on the total fluorides) to provide a partial pressure of boron trifluoride of 5 to 550 pounds per square inch, continuing the reaction at a temperature of −35 to 250° F. under a total pressure to maintain the hydrogen fluoride liquid at the temperature employed, whereby at least a part of said olefin is converted into saturated hydrocarbons along with the modification of the normal paraffin, and the amount of hydrocarbons accumulating in the liquid catalyst is minimized.

4. A process of catalytically treating hydrocarbons which comprises subjecting hydrocarbons comprising a normal paraffin and an olefin to the action of 5 to 300 volume per cent (based on the hydrocarbons) of a liquid catalyst comprising as its essential catalytic ingredients liquid hydrogen fluoride in which is dissolved not over 50 mol per cent of boron trifluoride (based on the total fluorides) to provide a partial pressure of boron trifluoride of 5 to 550 pounds per square inch, continuing the reaction at a temperature of −35 to 250° F. under a total pressure to maintain the hydrogen fluoride liquid at the temperature employed, and in the presence of added hydrogen to convert at least a part of said olefin into a saturated hydrocarbon along with the modification of the normal paraffin and to minimize appreciably the amount of hydrocarbons degraded into the liquid catalyst phase.

ROBERT E. BURK.

REFERENCES CITED

The following references are of record in the file of this patent:

UNITED STATES PATENTS

| Number | Name | Date |
|---|---|---|
| 2,158,559 | Atwell et al. | May 16, 1939 |
| 2,172,146 | Ruthruff | Sept. 5, 1939 |
| 2,200,090 | Evering et al. | Nov. 5, 1940 |
| 2,265,870 | Schult | Dec. 9, 1941 |
| 2,266,012 | d'Ouville et al. | Dec. 16, 1941 |
| 2,271,043 | van Peski | Jan. 27, 1942 |
| 2,318,226 | Ipatieff et al. | May 4, 1943 |
| 2,325,122 | Ipatieff et al. | July 27, 1943 |
| 2,344,890 | Whiteley | Mar. 21, 1944 |
| 2,357,495 | Bloch | Sept. 5, 1944 |

Certificate of Correction

Patent No. 2,446,998. August 17, 1948.

ROBERT E. BURK

It is hereby certified that errors appear in the printed specification of the above numbered patent requiring correction as follows: Column 1, line 9, for the word "present" read *presence*; line 50, for "pressure" read *pressures*; column 5, line 32, for "volumes" read *volume*; column 9, line 3, for "$HF_4$" read $BF_4$; and that the said Letters Patent should be read with these corrections therein that the same may conform to the record of the case in the Patent Office.

Signed and sealed this 16th day of November, A. D. 1948.

[SEAL]

THOMAS F. MURPHY,
*Assistant Commissioner of Patents.*